United States Patent
Matsumura

(10) Patent No.: US 11,502,518 B2
(45) Date of Patent: Nov. 15, 2022

(54) ENERGY MANAGEMENT DEVICE, ENERGY MANAGEMENT SYSTEM, AND ENERGY MANAGEMENT METHOD

(71) Applicant: SUMITOMO ELECTRIC INDUSTRIES, LTD., Osaka (JP)

(72) Inventor: Takafumi Matsumura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 29 days.

(21) Appl. No.: 16/754,691

(22) PCT Filed: May 11, 2018

(86) PCT No.: PCT/JP2018/018347
§ 371 (c)(1),
(2) Date: Apr. 8, 2020

(87) PCT Pub. No.: WO2019/082426
PCT Pub. Date: May 2, 2019

(65) Prior Publication Data
US 2021/0200175 A1 Jul. 1, 2021

(30) Foreign Application Priority Data
Oct. 23, 2017 (JP) .............................. JP2017-204618

(51) Int. Cl.
*H02J 3/14* (2006.01)
*H02J 13/00* (2006.01)
*G05B 19/042* (2006.01)

(52) U.S. Cl.
CPC ............ *H02J 3/144* (2020.01); *G05B 19/042* (2013.01); *H02J 3/14* (2013.01); *H02J 13/00* (2013.01);
(Continued)

(58) Field of Classification Search
CPC .......... G05B 19/042; G05B 2219/2639; H02J 13/00006; H02J 3/14
See application file for complete search history.

(56) References Cited

U.S. PATENT DOCUMENTS 8,843,242 B2 * 9/2014 Burt ........................ F24C 7/087
  700/295
9,852,484 B1 * 12/2017 Fonts ...................... G06Q 50/06
(Continued)

FOREIGN PATENT DOCUMENTS

EP   3 226 369 A1   10/2017
JP   2009-247188 A  10/2009
(Continued)

*Primary Examiner* — Thomas C Lee
*Assistant Examiner* — Ameir Myers
(74) *Attorney, Agent, or Firm* — Oliff PLC

(57) ABSTRACT

This energy management device is provided at a customer and is capable of controlling an electric appliance of the customer by communicating with a server. The server is configured to send a request for demand response. The energy management device includes: a receiver configured to receive the request for the demand response from the server; a transmitter configured to transmit a response indicating participation or nonparticipation with respect to the request; an electric appliance control unit configured to control the electric appliance; and an information acquisition unit configured to acquire information of the electric appliance. When determination that the request for the demand response is not achievable has been made after the response indicating participation has been transmitted, a response indicating nonparticipation is transmitted.

7 Claims, 8 Drawing Sheets

(52) U.S. Cl.
CPC .............. *H02J 13/00006* (2020.01); *G05B 2219/2639* (2013.01)

(56) References Cited

U.S. PATENT DOCUMENTS

| | | | | |
|---|---|---|---|---|
| 2011/0202185 | A1* | 8/2011 | Imes | H02J 13/0079 700/277 |
| 2013/0054758 | A1* | 2/2013 | Imes | H04L 47/70 709/219 |
| 2014/0330695 | A1* | 11/2014 | Steven | G06Q 30/0283 705/37 |
| 2015/0338869 | A1* | 11/2015 | Behrangrad | G05B 15/02 700/291 |
| 2016/0373453 | A1 | 12/2016 | Ruffner et al. | |
| 2017/0097622 | A1* | 4/2017 | Ohama | H02J 3/14 |
| 2018/0175620 | A1* | 6/2018 | Fukuda | H02J 13/00004 |
| 2018/0191196 | A1* | 7/2018 | Lee | G07F 15/008 |
| 2018/0262003 | A1* | 9/2018 | Yabe | H02J 13/00004 |
| 2018/0267701 | A1* | 9/2018 | Rigg | G06F 3/0482 |
| 2018/0321648 | A1 | 11/2018 | Makino et al. | |
| 2018/0356782 | A1* | 12/2018 | EIBsat | G05B 19/042 |

FOREIGN PATENT DOCUMENTS

| | | |
|---|---|---|
| JP | 2015-226434 A | 12/2015 |
| JP | 2017-011793 A | 1/2017 |
| JP | 2017-038469 A | 2/2017 |
| JP | 2017-112646 A | 6/2017 |
| JP | 2017-184461 A | 10/2017 |
| WO | 2017/018530 A1 | 2/2017 |

* cited by examiner

ENERGY MANAGEMENT DEVICE, ENERGY MANAGEMENT SYSTEM, AND ENERGY MANAGEMENT METHOD

TECHNICAL FIELD

The present invention relates to an energy management device, an energy management system, and an energy management method.

This application claims priority on Japanese Patent Application No. 2017-204618 filed on Oct. 23, 2017, the entire content of which is incorporated herein by reference.

BACKGROUND ART

With respect to power supply and demand, adjustment of power consumption is considered not only on the supply side but also on the customer side. For example, there is power adjustment that utilizes "demand response" in which a specific company (aggregator) goes between a power company and a customer, the aggregator requests the customer to suppress power consumption, and the customer suppresses a power peak in response to the request. The demand response is realized in such a manner that a customer receives, from the demand response aggregator side, a notification that requests participation in demand response, and the customer having received the notification participates in the demand response (for example, see PATENT LITERATURE 1). The demand response aggregator can receive an incentive of a consideration from the power company, by achieving the demand response request, for example.

CITATION LIST

Patent Literature

PATENT LITERATURE 1: Japanese Laid-Open Patent Publication No. 2017-38469

SUMMARY OF INVENTION

Energy Management Device

An energy management device according to an aspect of the present invention is an energy management device provided at a customer and capable of controlling an electric appliance of the customer by communicating with a server, the server being configured to send a request for demand response. The energy management device includes: a receiver configured to receive the request for the demand response from the server; a transmitter configured to transmit a response indicating participation or nonparticipation with respect to the request; an electric appliance control unit configured to control the electric appliance; and an information acquisition unit configured to acquire information of the electric appliance. When determination that the request for the demand response is not achievable has been made after the response indicating participation has been transmitted, a response indicating nonparticipation is transmitted.

Energy Management System

An energy management system according to an aspect of the present invention includes: an energy management device provided at a customer and capable of controlling electric appliances of the customer by communicating with a server, the server being configured to send a request for demand response; and a power storage device provided, at the customer, as one of the electric appliances, the power storage device having a function of transmitting information indicating a power storage state of the power storage device to provide the information to the energy management device. The energy management device includes: a receiver configured to receive the request for the demand response from the server; a transmitter configured to transmit a response indicating participation or nonparticipation with respect to the request; an electric appliance control unit configured to control each electric appliance; and an information acquisition unit configured to acquire information of the electric appliance. After the response indicating participation has been transmitted, the information indicating the power storage state of the power storage device is acquired, and when determination that the request for the demand response is not achievable has been made on the basis of the acquired information, a response indicating nonparticipation is transmitted.

An energy management system according to an aspect of the present invention includes: a server configured to send a request for demand response; and an energy management device provided at a customer and capable of controlling an electric appliance of the customer by communicating with the server. The energy management device includes: a receiver configured to receive the request for the demand response from the server; a transmitter configured to transmit a response indicating participation or nonparticipation with respect to the request; an electric appliance control unit configured to control the electric appliance; and an information acquisition unit configured to acquire information of the electric appliance. After the response indicating participation has been transmitted, the information of the electric appliance is acquired, and when determination that the request for the demand response is not achievable has been made on the basis of the acquired information, a response indicating nonparticipation is transmitted.

Energy Management Method

An energy management method according to an aspect of the present invention is to be performed between a server configured to send a request for demand response, and an energy management device provided at a customer and capable of controlling an electric appliance of the customer by communicating with the server. The energy management method includes: transmitting, by the server, the request for the demand response to the energy management device; transmitting, by the energy management device, a response indicating participation, when demand response is possible at a time point of reception of the request; acquiring, by the energy management device, information of the electric appliance after the response indicating participation has been transmitted, and transmitting, by the energy management device, a response indicating nonparticipation when, on the basis of the acquired information, the energy management device has determined that the request for the demand response is not achievable; and transmitting, by the server, a request for demand response to an energy management device of another customer when the server has received the response indicating nonparticipation.

DESCRIPTION OF EMBODIMENTS

Figure 1:
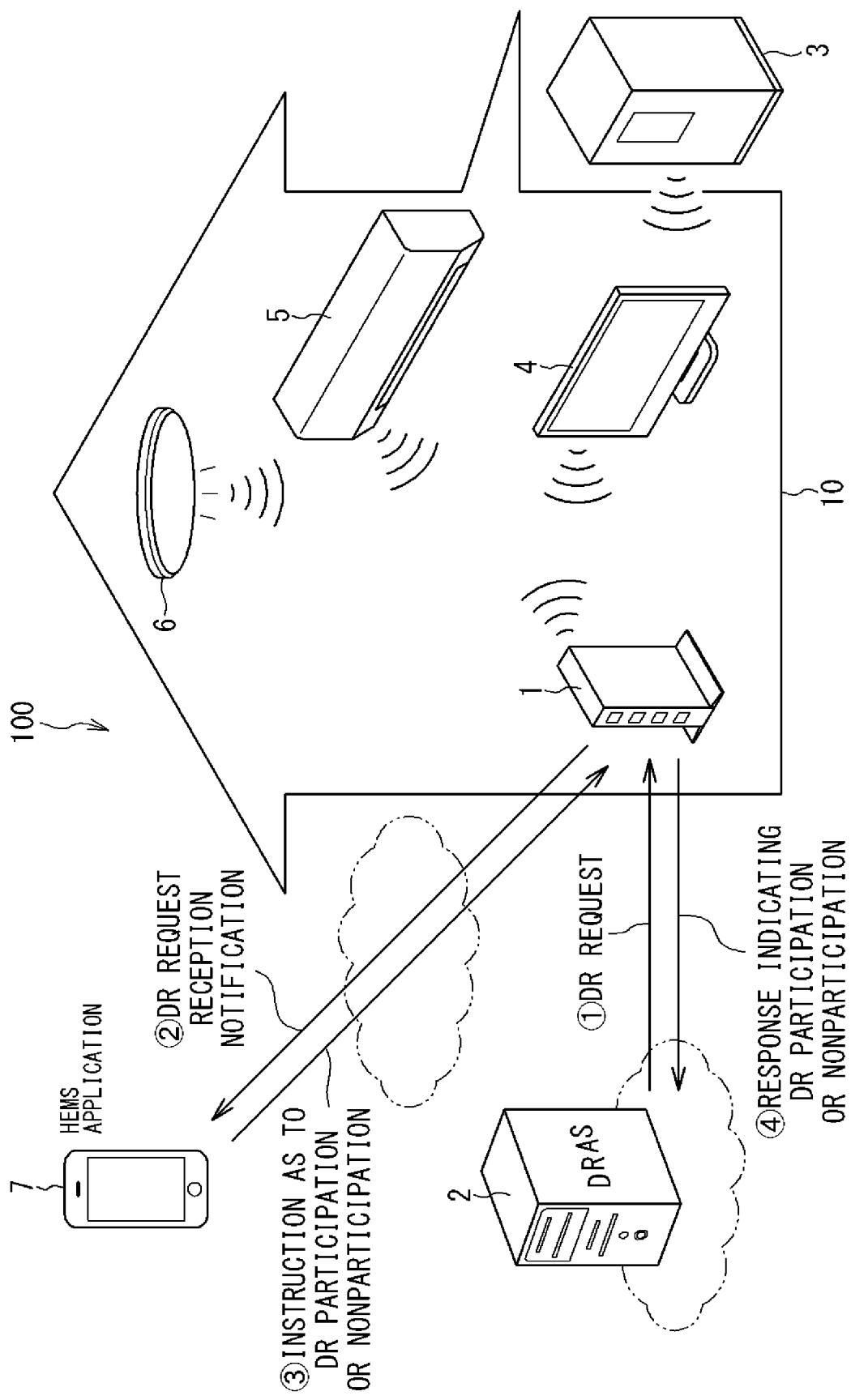
FIG. 1 shows an example of a system configuration of an energy management system.

Problems to be Solved by the Present Disclosure

Regarding a small-scale customer such as a home, adjustment capability is small. Thus, there are some cases where, although the customer has participated in demand response, the customer cannot realize power adjustment as planned. Also, when the period of demand response is long, even if power adjustment can be easily realized at the beginning of the period, the power adjustment may become difficult to be realized in the course of the period, or a disadvantage for the customer may arise. Meanwhile, if many customers cannot achieve demand response requests during the period of demand response, the demand response aggregator cannot realize power adjustment as planned.

In view of the above problem, an object of the present disclosure is to preventively suppress adverse effects of demand response to a customer and a demand response aggregator.

Effects of the Present Disclosure

According to the present disclosure, adverse effects of demand response to a customer and a demand response aggregator can be preventively inhibited.

SUMMARY OF EMBODIMENTS

Summary of embodiments of the present disclosure includes at least the following.

Energy Management Device (1) This is an energy management device provided at a customer and capable of controlling an electric appliance of the customer by communicating with a server, the server being configured to send a request for demand response. The energy management device includes: a receiver configured to receive the request for the demand response from the server; a transmitter configured to transmit a response indicating participation or nonparticipation with respect to the request; an electric appliance control unit configured to control the electric appliance; and an information acquisition unit configured to acquire information of the electric appliance. When determination that the request for the demand response is not achievable has been made after the response indicating participation has been transmitted, a response indicating nonparticipation is transmitted.

In this energy management device, even in a case where a request for demand response has been received and a response indicating participation has been transmitted once, if, thereafter, the state has changed into a state in which the request for the demand response is not achievable, a response indicating nonparticipation can be transmitted to cancel the commitment to the demand response. According to this energy management device, adverse effects of demand response to the customer and the demand response aggregator can be preventively inhibited.

Energy Management System (2) This is an energy management system including: an energy management device provided at a customer and capable of controlling electric appliances of the customer by communicating with a server, the server being configured to send a request for demand response; and a power storage device provided, at the customer, as one of the electric appliances, the power storage device having a function of transmitting information indicating a power storage state of the power storage device to provide the information to the energy management device. The energy management device includes: a receiver configured to receive the request for the demand response from the server; a transmitter configured to transmit a response indicating participation or nonparticipation with respect to the request; an electric appliance control unit configured to control each electric appliance; and an information acquisition unit configured to acquire information of the electric appliance. After the response indicating participation has been transmitted, the information indicating the power storage state of the power storage device is acquired, and when determination that the request for the demand response is not achievable has been made on the basis of the acquired information, a response indicating nonparticipation is transmitted.

In this energy management system, even in a case where a request for demand response has been received and the energy management device has transmitted a response indicating participation once, if, thereafter, the state has changed into a state in which the request for the demand response is not achievable due to a change in the power storage state, the energy management device can transmit a response indicating nonparticipation to cancel the commitment to the demand response. According to this energy management system, adverse effects of demand response to the customer and the demand response aggregator can be preventively inhibited.

(3) This is an energy management system including: a server configured to send a request for demand response; and an energy management device provided at a customer and capable of controlling an electric appliance of the customer by communicating with the server. The energy management device includes: a receiver configured to receive the request for the demand response from the server;

a transmitter configured to transmit a response indicating participation or nonparticipation with respect to the request; an electric appliance control unit configured to control the electric appliance; and an information acquisition unit configured to acquire information of the electric appliance. After the response indicating participation has been transmitted, the information of the electric appliance is acquired, and when determination that the request for the demand response is not achievable has been made on the basis of the acquired information, a response indicating nonparticipation is transmitted.

In this energy management system, even in a case where a request for demand response has been received and the energy management device has transmitted a response indicating participation once, if, thereafter, the state has changed into a state in which the request for the demand response is not achievable due to a change in the power storage state, the energy management device can transmit a response indicating nonparticipation to cancel the commitment to the demand response. In this case, the server transmits a request for demand response to an energy management device of another customer. According to this energy management system, adverse effects of demand response to the customer and the demand response aggregator can be preventively inhibited.

(4) The energy management system of (3) may include an information terminal communicable with the energy management device, and the energy management device may have a function of receiving a setting for the electric appliance from the information terminal.

In this case, when the electric appliance to be controlled is an air conditioner, for example, the user of the energy management device can set the temperature setting for the air conditioner to a desired value through the information terminal. On the basis of the temperature setting, the energy management device can determine whether or not it is possible to participate in the demand response, and in a case of participation having been made, the energy management device can determine whether or not it is possible to continue the participation thereafter.

(5) In the energy management system of (4), the energy management device may notify the information terminal that the energy management device has received the request, and the energy management device may receive an instruction as to participation or nonparticipation from the information terminal, and transmit a response to the server.

In this case, when the energy management device is to determine whether or not it is possible to participate in the demand response, and when, in a case of participation having been made, the energy management device is to determine whether or not it is possible to continue the participation thereafter, the energy management device can perform determination based on a logic set in the energy management device, and also, determination based on an instruction from the user.

Energy Management Method (6) Meanwhile, this is an energy management method to be performed between a server configured to send a request for demand response, and an energy management device provided at a customer and capable of controlling an electric appliance of the customer by communicating with the server. The energy management method includes: transmitting, by the server, the request for the demand response to the energy management device; transmitting, by the energy management device, a response indicating participation, when demand response is possible at a time point of reception of the request; acquiring, by the energy management device, information of the electric appliance after the response indicating participation has been transmitted, and transmitting, by the energy management device, a response indicating nonparticipation when, on the basis of the acquired information, the energy management device has determined that the request for the demand response is not achievable; and transmitting, by the server, a request for demand response to an energy management device of another customer when the server has received the response indicating nonparticipation.

In this energy management method, even in a case where a request for demand response has been received and the energy management device has transmitted a response indicating participation once, if, thereafter, the state has changed into a state in which the request for the demand response is not achievable due to a change in the power storage state, the energy management device can transmit a response indicating nonparticipation to cancel the commitment to the demand response. In this case, the server transmits a request for demand response to an energy management device of another customer. According to this energy management method, adverse effects of demand response to the customer and the demand response aggregator can be preventively inhibited.

DETAILS OF EMBODIMENTS

An energy management device, an energy management system, and an energy management method according to an embodiment of the present disclosure will be described with reference to the drawings.

Configuration Example of Energy Management System

FIG. 1 shows an example of a system configuration of an energy management system. In FIG. 1, an energy management system 100 is mainly composed of an HEMS (Home Energy Management System) controller 1 as an "energy management device" provided at a customer 10, various electric appliances of the customer 10, and a server 2 that requests demand response.

The HEMS controller 1 is a device that is also referred to as an HEMS gateway, includes a computer and a storage device (not shown), and realizes necessary functions as a result of software (computer program) being executed by the computer. The software is stored in the storage device.

Examples of the electric appliances of the customer 10 include a power storage device 3, a television 4, an air conditioner 5, a lighting apparatus 6, and the like. The HEMS controller 1 can monitor and control these electric appliances through communication using a common home network communication standard. As such a communication standard, the ECHONET Lite standard is considered.

The above-mentioned control includes, for example, control for power consumption suppression in which power purchase from a commercial power system is reduced, and control for restoration from a suppressed state. As for the power storage device 3, an electric vehicle (EV) or a plug-in hybrid vehicle (PHV) as well as a dedicated fixed-type power storage device can serve as a power storage device.

For example, if the power storage device 3 is caused to discharge power stored in a built-in storage battery so as to compensate for at least a part of load in the customer, power purchase from a commercial power system can be reduced.

Discharge from storage batteries in small-scale customers such as ordinary homes brings about a significant power consumption suppression effect, from the viewpoint of the commercial power system.

Other than this, as for the air conditioner 5 which causes relatively large power consumption, if the strength of cooling or heating is reduced, power can be saved. As for the television 4, for example, if an energy saving mode is set to reduce the brightness of the screen to an extent that would not cause any problem, power can be saved. As for the lighting apparatus 6, if the light thereof can be modulated, power can be saved by reducing the brightness.

The HEMS controller 1 is communicable with the server 2 via an internet line. In addition, the HEMS controller 1 is communicable via the internet line with an information terminal 7 of a user as the customer 10. The information terminal 7 is typically a smartphone, and has installed therein an HEMS application necessary for communication with the HEMS controller 1.

Example of Demand Response

In the energy management system 100 configured as above, when a request for demand response is made from the server 2, the HEMS controller 1 having received the request notifies, in the form of a "push notification", the information terminal 7 of the reception of the request.

Figure 2:
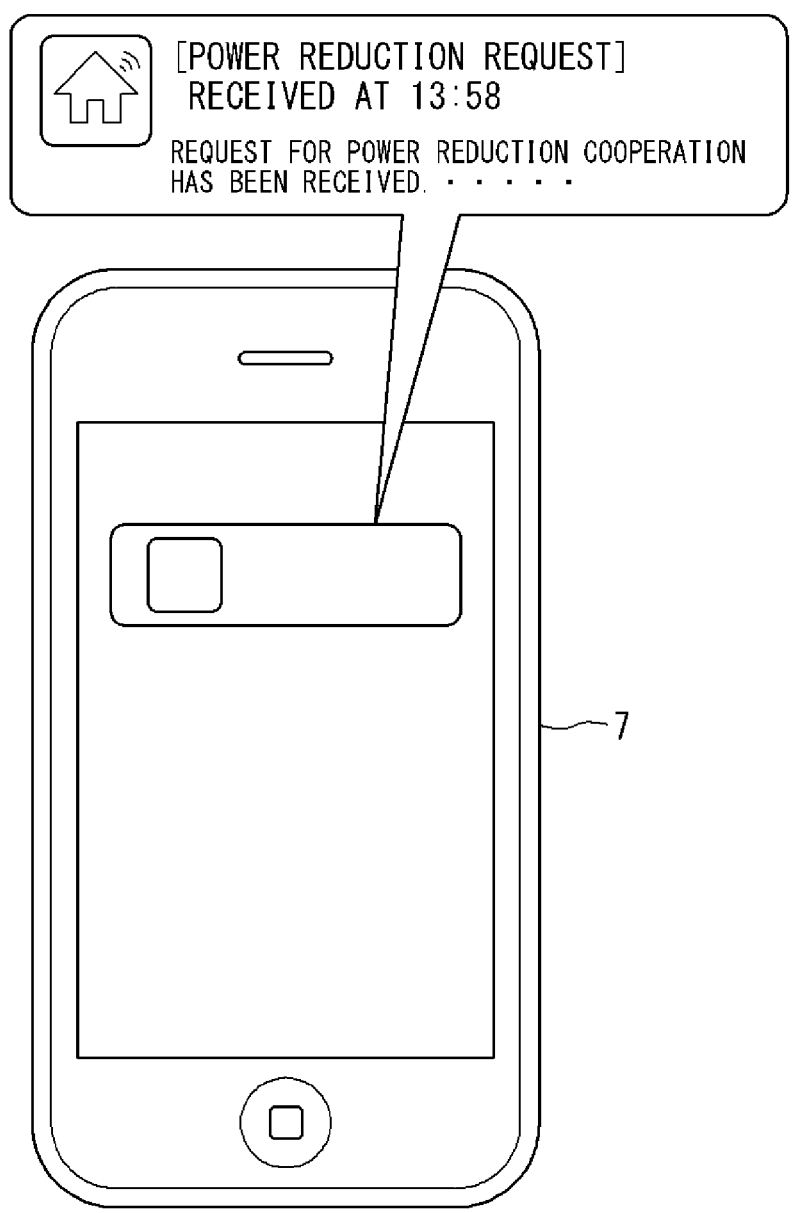
FIG. 2 shows an example of a screen displayed on an information terminal.

FIG. 2 shows an example of a screen displayed on the information terminal 7. On the information terminal 7, "Request for power reduction cooperation has been received. Please answer whether or not to participate." is displayed as a request for demand response, for example. Here, the user carrying the information terminal 7 can express an intention as to participation or nonparticipation.

With reference back to FIG. 1, the intention as to participation or nonparticipation in the demand response is sent to the HEMS controller 1. The HEMS controller 1 answers, to the server 2, whether or not to participate in the demand response.

Making a notification to the user and requesting an answer are merely an example. The HEMS controller 1 may determine whether or not to receive a request for demand response on the basis of a logic set in the HEMS controller 1. However, for example, power saving by the air conditioner 5 is directly related to the comfort of the user, and thus, in some cases, it is preferable to allow determination based on an instruction from the user.

When the HEMS controller 1 has answered as participating in the demand response, the HEMS controller 1 controls an electric appliance of the customer 10, thereby performing saving of commercial power for a certain period. After the certain period has elapsed, the HEMS controller 1 controls the electric appliance of the customer 10 to be restored to the original state thereof before the start of the power saving.

First Example of Specific Demand Response

Next, a case where commercial power is saved by compensating for power consumption of the customer 10 by utilizing the power storage device 3 is described. When the power storage device 3 is provided to the customer 10, the HEMS controller 1 needs to understand the state of the power storage device 3 (remaining power amount, operation state, error information, etc.). Thus, the HEMS controller 1 periodically sends a signal for monitoring the power storage device 3, and the power storage device 3 having received the signal transmits necessary information to notify the HEMS controller 1. Thus, as for discharge from the power storage device 3, confirmation of the intention of the user by the information terminal 7 may be omitted, and the HEMS controller 1 may determine to cause the power storage device 3 to discharge.

Figure 3:
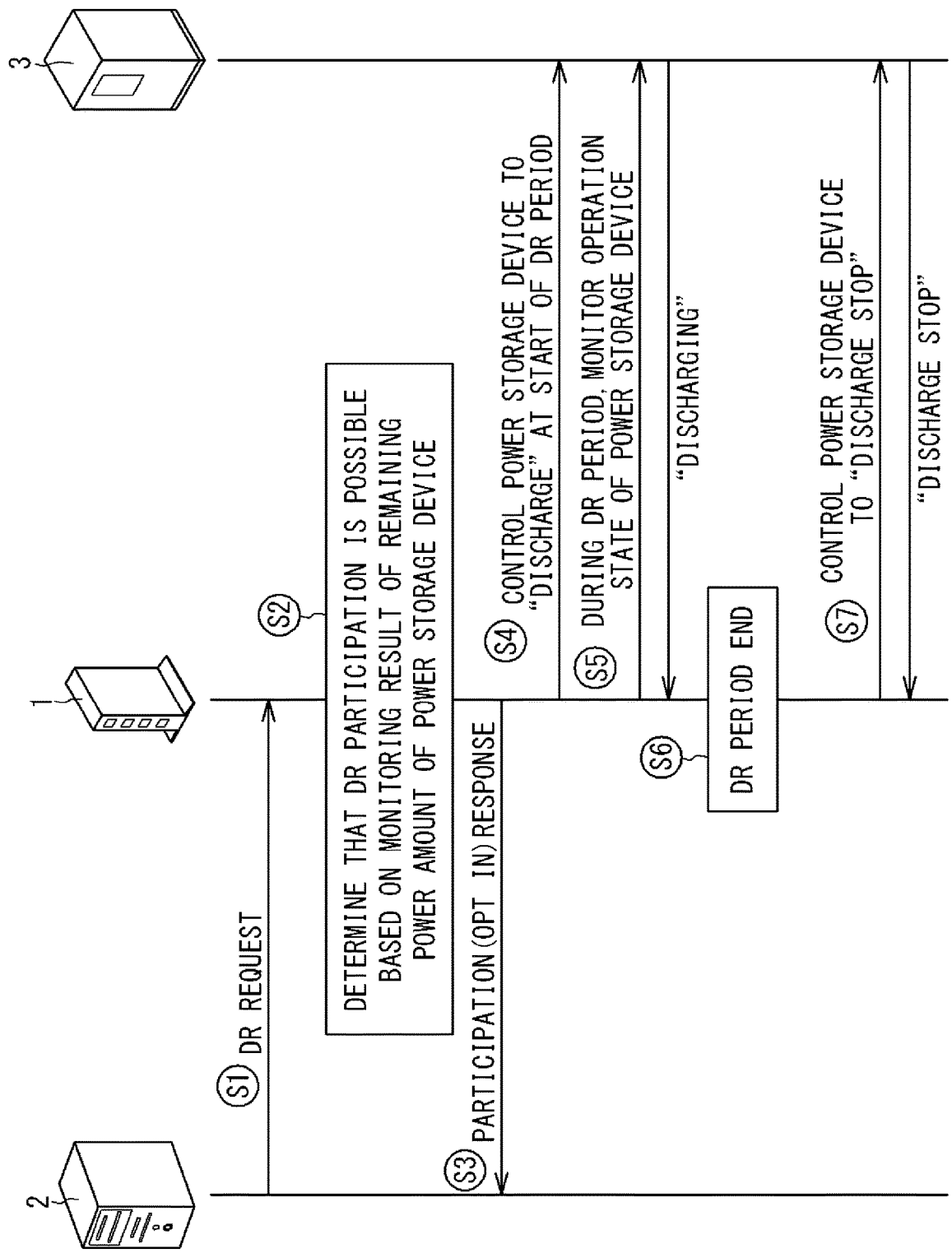
FIG. 3 is an example of a sequence diagram of demand response performed between a server, an HEMS (Home Energy Management System) controller, and a power storage device, and shows a case where the demand response is achievable as planned.

FIG. 3 is an example of a sequence diagram of demand response performed between the server 2, the HEMS controller 1, and the power storage device 3, and shows a case where the demand response is achievable as planned.

In FIG. 3, first, the server 2 sends a request for demand response to the HEMS controller 1 (step S1). The HEMS controller 1 having received the request determines that it is possible to participate in the demand response on the basis of a monitoring result of the remaining power amount of the power storage device 3 (step S2), and sends, to the server 2, a response that indicates participation (Opt In) (step S3). Meanwhile, when the remaining power amount of the power storage device 3 is small and discharge cannot be performed, a response that indicates nonparticipation is sent. In this case, no subsequent steps are performed.

The HEMS controller 1 having sent the response indicating participation controls the power storage device 3 to be in a state of "discharge", at the start of the demand response notified of from the server 2 (step S4). In addition, during the period of the demand response, the HEMS controller 1 monitors the operation state of the power storage device 3 (step S5), and the power storage device 3 replies that the power storage device 3 is discharging.

Then, when the period of the demand response ends (step S6), the HEMS controller 1 controls the power storage device 3 to stop discharging (step S7). In this manner, the request for the demand response that has been requested can be achieved.

Figure 4:
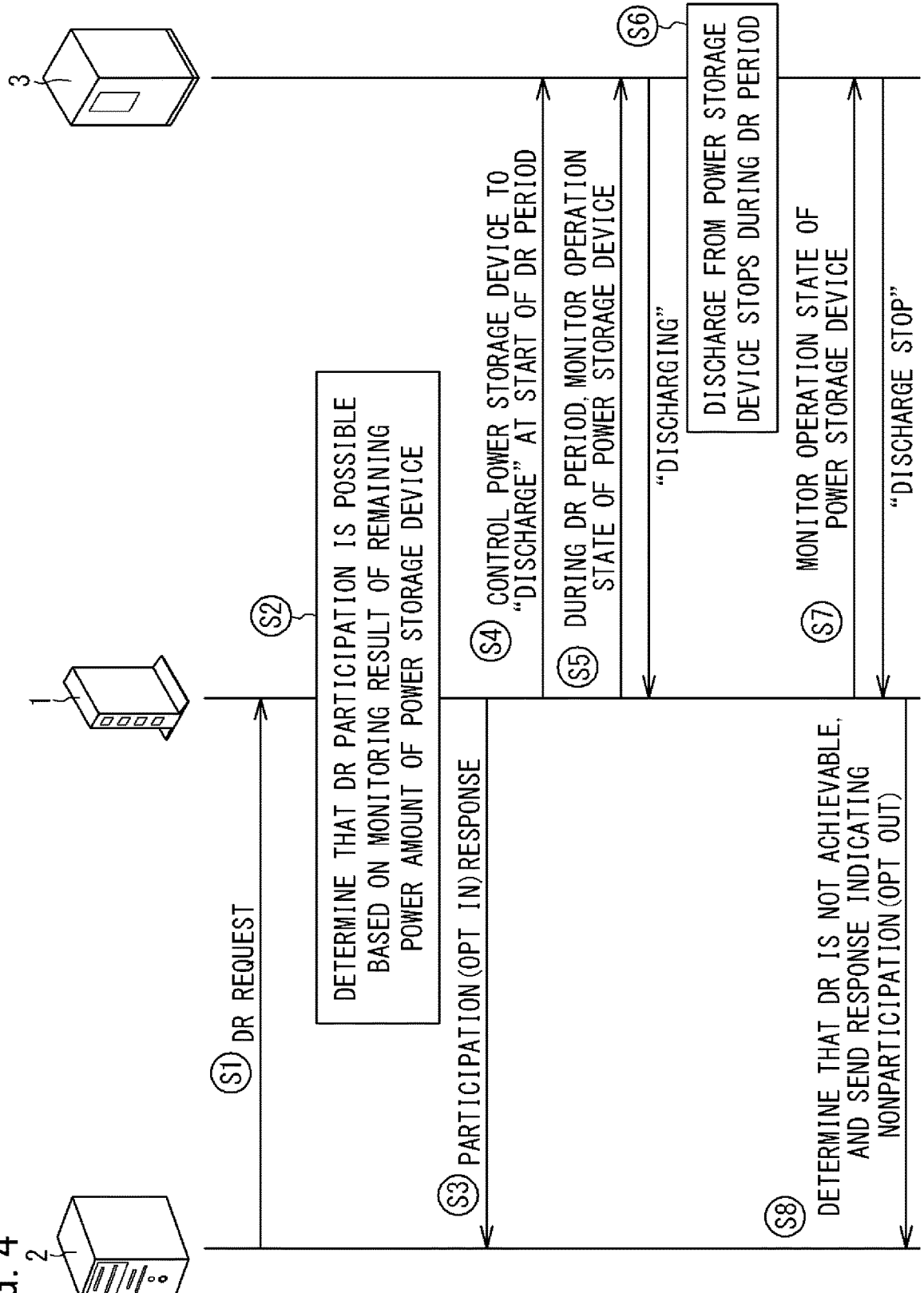
FIG. 4 is another example of the sequence diagram of demand response performed between the server, the HEMS controller, and the power storage device, and shows a case where the demand response is not achievable.

Next, FIG. 4 is another example of the sequence diagram of demand response performed between the server 2, the HEMS controller 1, and the power storage device 3, and shows a case where the demand response is not achievable.

In FIG. 4, first, the server 2 sends a request for demand response to the HEMS controller 1 (step S1). The HEMS controller 1 having received the request determines that it is possible to participate in the demand response on the basis of a monitoring result of the remaining power amount of the power storage device 3 (step S2), and sends, to the server 2, a response indicating participation (Opt In) (step S3). Meanwhile, when the remaining power amount of the power storage device 3 is small and discharge cannot be performed, a response indicating nonparticipation is sent. In this case, no subsequent steps are performed.

The HEMS controller 1 having sent the response indicating participation controls the power storage device 3 to be in a state of "discharge", at the start of the demand response notified of from the server 2 (step S4). In addition, during the period of the demand response, the HEMS controller 1 monitors the operation state of the power storage device 3 (step S5), and the power storage device 3 replies that the power storage device 3 is discharging.

Then, during the period of the demand response, when the remaining power amount of the power storage device 3 has reached a lower limit value set by the user, or when an abnormality has occurred, the power storage device 3 automatically stops discharging (step S6). On the basis of the monitoring and a reply indicating the stop of the discharging (step S7), the HEMS controller 1 recognizes that the discharging has stopped, determines that the request for the demand response being requested is not achievable, and sends, to the server 2, a response indicating nonparticipation (Opt Out) (step S8).

According to the HEMS controller 1, or the energy management system 100 including the power storage device 3 and the HEMS controller 1, even in a case where a request for demand response has been received and a response indicating participation has been sent once, if, thereafter, the state has changed into a state in which the request for the demand response is not achievable due to a change in the power storage state, a response indicating nonparticipation can be sent to cancel the commitment to the demand response.

The server 2 having received the response indicating nonparticipation sends a request for demand response to an HEMS controller 1 of another customer. If, in spite of the occurrence of the state in which the demand response is not achievable, this fact is not notified of to the server 2, the server 2 cannot take the next action, or will be late in taking measures.

That is, when the energy management device is viewed as not only serving one customer but also serving a district, if the server 2 having received a response indicating nonparticipation sends a request for demand response to an energy management device of another customer, the server 2 can determine a substitute for the customer receiving the request for demand response, and can realize demand response as a whole district.

Second Example of Specific Demand Response

Next, a case where commercial power is saved according to an operation mode of the air conditioner 5 is described.

Figure 5:
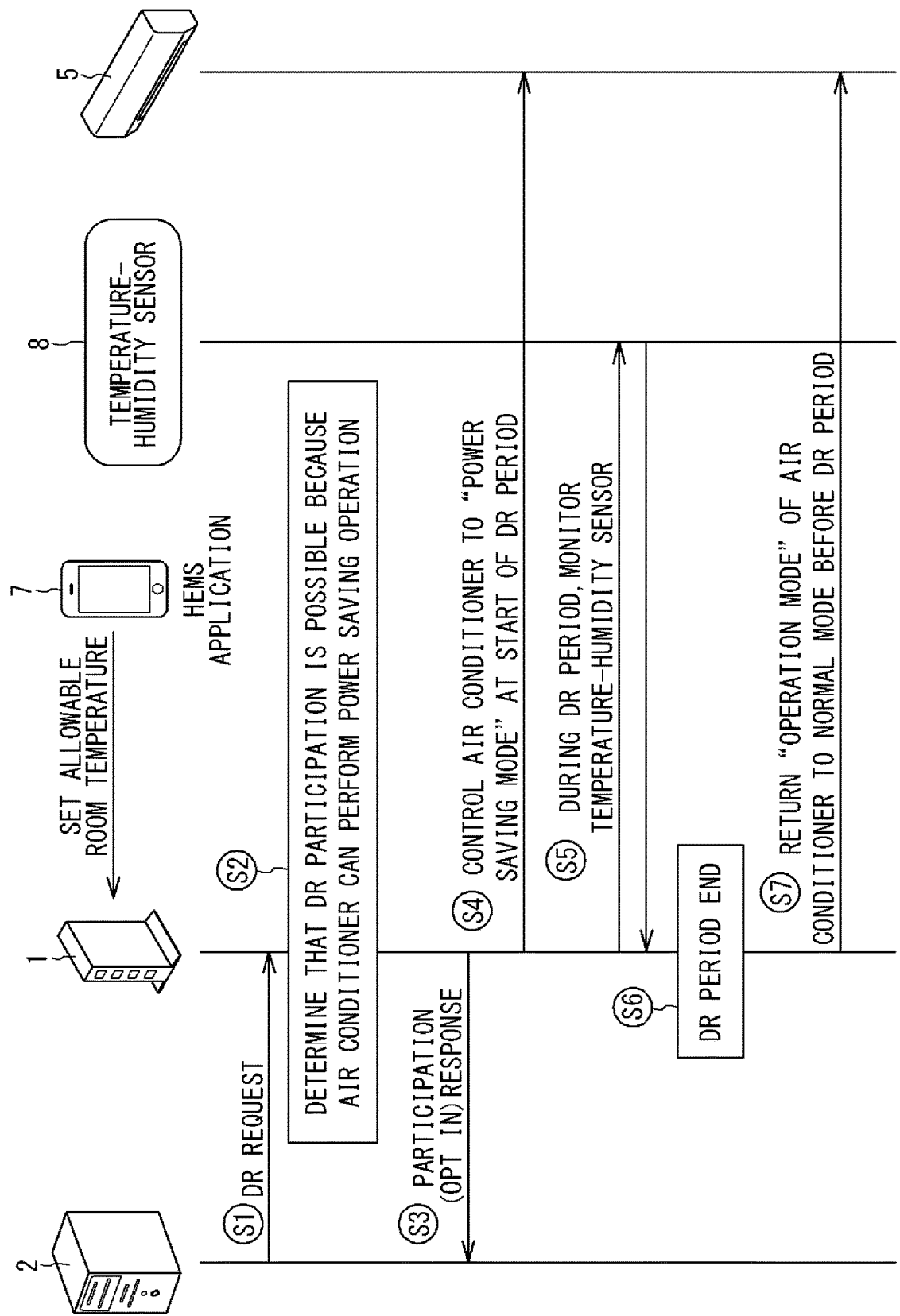
FIG. 5 is an example of a sequence diagram of demand response performed between the server, the HEMS controller, an air conditioner, and a temperature-humidity sensor provided in a room where the air conditioner is installed, and shows a case where the demand response is achievable as planned.

FIG. 5 is an example of a sequence diagram of demand response performed between the server 2, the HEMS controller 1, the air conditioner 5, and a temperature-humidity sensor 8 provided in a room where the air conditioner 5 is installed, and shows a case where the demand response is achievable as planned. It is assumed that the HEMS controller 1 is monitoring the operation status of the air conditioner 5 and the air conditioner 5 is currently operating. An allowable room temperature has been set to the HEMS controller 1 from the information terminal 7. The allowable room temperature is an upper or lower limit room temperature that is allowable by a person present in the room where the air conditioner 5 is installed.

In FIG. 5, first, the server 2 sends a request for demand response to the HEMS controller 1 (step S1). The HEMS controller 1 having received the request determines that it is possible to participate in the demand response because the air conditioner 5 is in normal operation and power saving operation is possible (step S2). Then, the HEMS controller 1 sends, to the server 2, a response indicating participation (Opt In) (step S3). Meanwhile, when the air conditioner 5 is already in power saving operation, a response indicating nonparticipation is sent. In this case, no subsequent steps are performed.

The HEMS controller 1 having sent the response indicating participation controls the operation of the air conditioner 5 to be in a state of "power saving mode", at the start of the demand response notified of from the server 2 (step S4). In addition, during the period of the demand response, the HEMS controller 1 monitors the temperature-humidity sensor 8 and acquires information of the room temperature (step S5).

Then, when the period of the demand response ends (step S6), the HEMS controller 1 returns the operation mode of the air conditioner 5 to "normal mode" having been used before the period of the demand response (step S7). In this manner, the request for the demand response that has been requested can be achieved.

Figure 6:
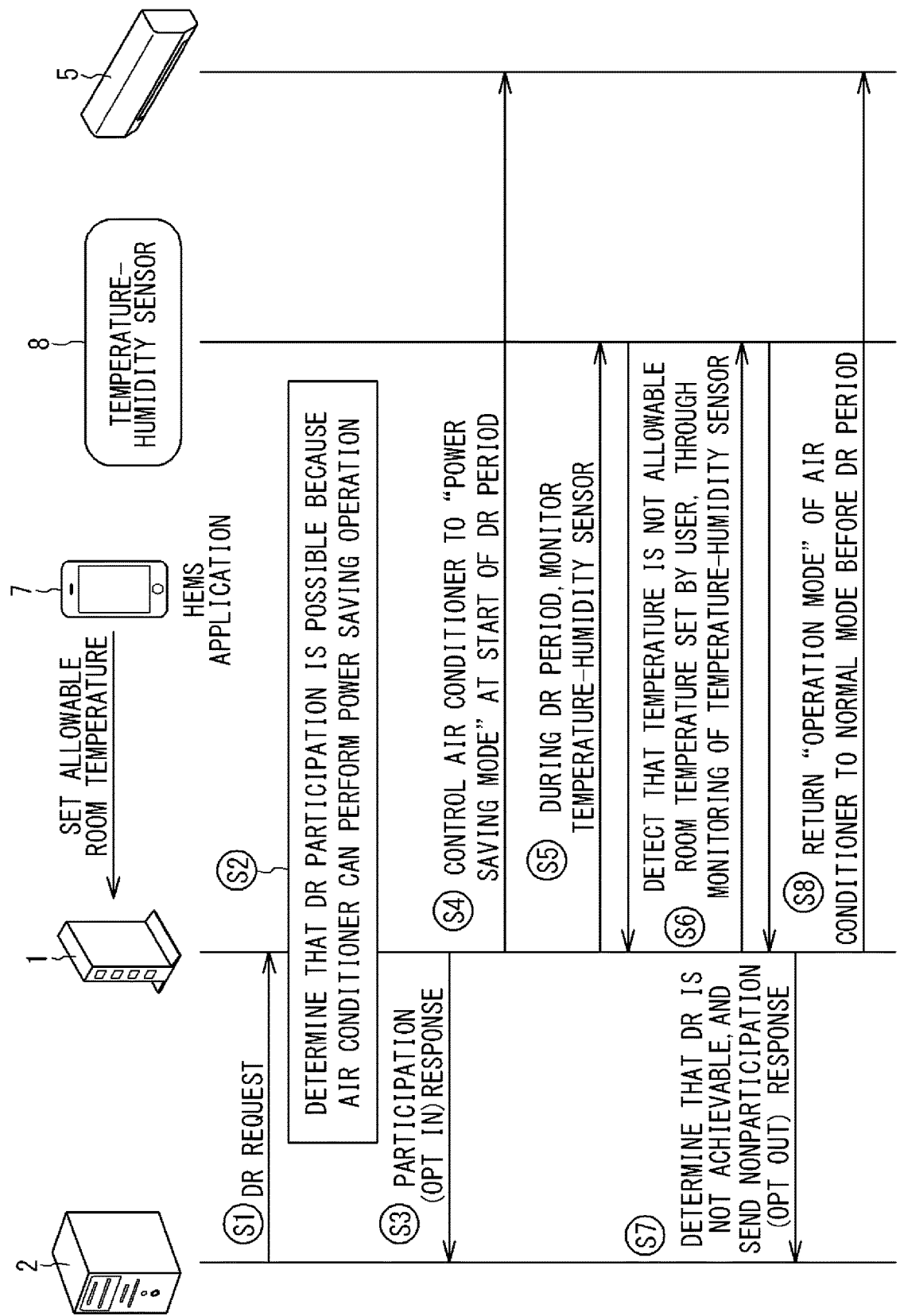
FIG. 6 is another example of the sequence diagram of demand response performed between the server, the HEMS controller, the air conditioner, and the temperature-humidity sensor provided in the room where the air conditioner is installed, and shows a case where the demand response is not achievable.

Next, FIG. 6 is another example of the sequence diagram of demand response performed between the server 2, the HEMS controller 1, the air conditioner 5, and the temperature-humidity sensor 8 provided in the room where the air conditioner 5 is installed, and shows a case where the demand response is not achievable. It is assumed that the HEMS controller 1 is monitoring the operation status of the air conditioner 5 and the air conditioner 5 is currently operating. An allowable room temperature has been set to the HEMS controller 1 from the information terminal 7. The allowable room temperature is an upper or lower limit room temperature that is allowable by a person present in the room where the air conditioner 5 is installed.

In FIG. 6, first, the server 2 sends a request for demand response to the HEMS controller 1 (step S1). The HEMS controller 1 having received the request determines that it is possible to participate in the demand response because the air conditioner 5 is in normal operation and power saving operation is possible (step S2). Then, the HEMS controller 1 sends, to the server 2, a response indicating participation (Opt In) (step S3). Meanwhile, when the air conditioner 5 is already in power saving operation, a response indicating nonparticipation is sent. In this case, no subsequent steps are performed.

The HEMS controller 1 having sent the response indicating participation controls the operation of the air conditioner 5 to be in a state of "power saving mode", at the start of the demand response notified of from the server 2 (step S4). In addition, during the period of the demand response, the HEMS controller 1 monitors the temperature-humidity sensor 8 and acquires information of the room temperature (step S5).

Then, when the room temperature becomes outside the allowable room temperature, i.e., the room temperature has become over the upper limit or below the lower limit during the period of the demand response (step S6), the HEMS controller 1 determines that the request for the demand response being requested is not achievable, and sends a response indicating nonparticipation (Opt Out) (step S7). Then, the HEMS controller 1 returns the operation mode of the air conditioner 5 from the power saving mode to the normal mode (step S8).

In the example described above, operations only regarding the room temperature has been described. However, for example, in a case where the air conditioner 5 is in dehumidification operation, a limit value for humidity may be set and a power saving mode for the dehumidification operation may be executed.

According to the HEMS controller 1, or the energy management system 100 including the power storage device 3 and the HEMS controller 1, even in a case where a request for demand response has been received and a response indicating participation has been sent once, if, thereafter, the state has changed into a state in which the request for the demand response is not achievable because the temperature is no longer the allowable room temperature, a response indicating nonparticipation can be sent to cancel the commitment to the demand response.

The server 2 having received the response indicating nonparticipation sends a request for demand response to an HEMS controller 1 of another customer.

That is, when the energy management device is viewed as not only serving one customer but also serving a district, if the server 2 having received a response indicating nonparticipation sends a request for demand response to an energy management device of another customer, the server 2 can determine a substitute for the customer receiving the request for demand response, and can realize demand response as a whole district.

Another Example of Specific Demand Response

In the embodiment above, a case where power consumption is suppressed on the basis of a request for demand response has been described. In contrast, there is also a case where power consumption is urged by a request for demand response. For example, there is a case where too much power is generated by photovoltaic power generation in the district of customers. In this case, for example, it is possible to preferentially cause a customer that has a power storage device to perform charging.

Figure 7:
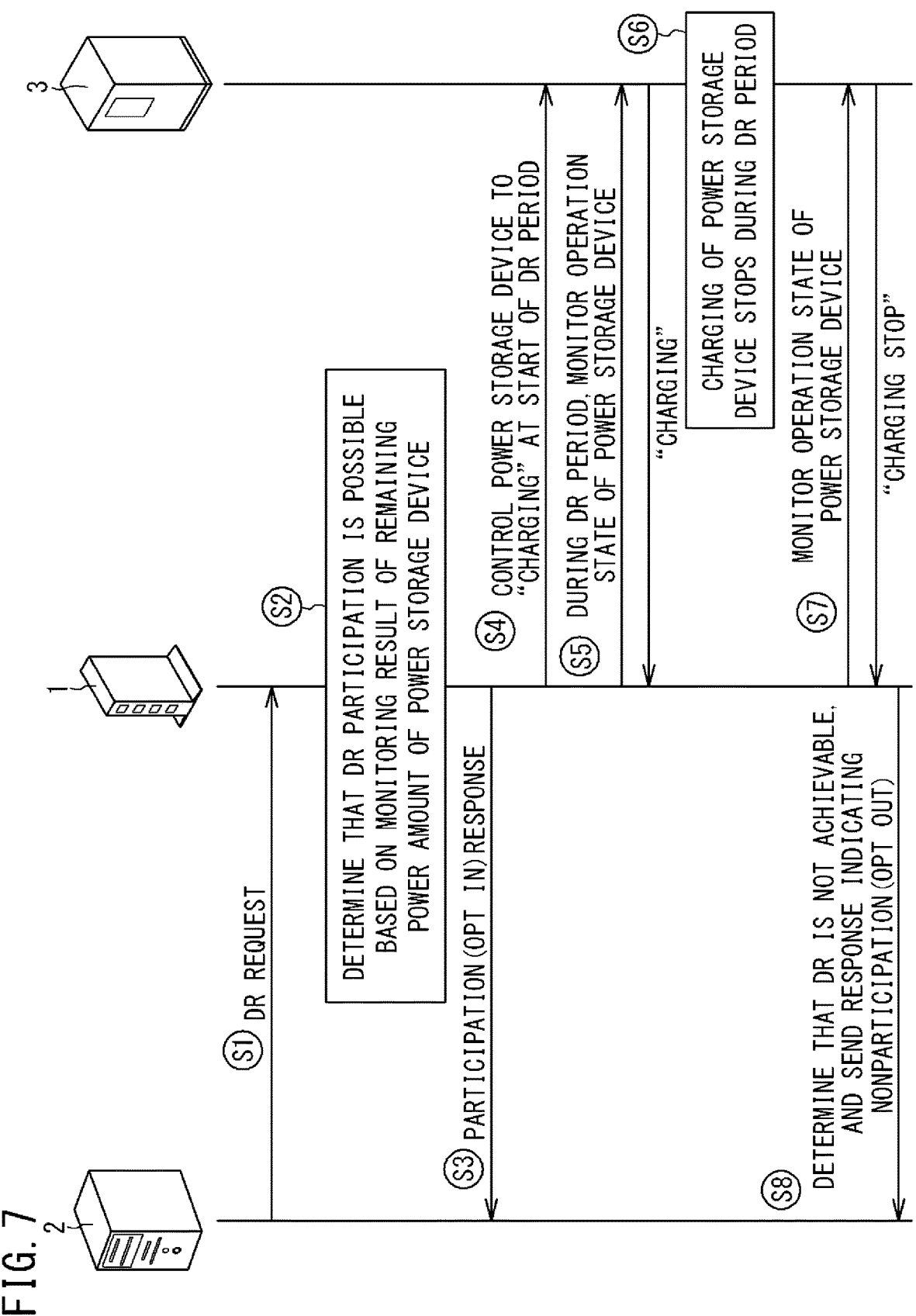
FIG. 7 is still another example of the sequence diagram of demand response performed between the server, the HEMS controller, and the power storage device, and shows a case where the demand response is not achievable.

For example, FIG. 7 is still another example of the sequence diagram of demand response performed between the server 2, the HEMS controller 1, and the power storage device 3, and shows a case where the demand response is not achievable.

In FIG. 7, first, the server 2 sends a request for demand response to the HEMS controller 1 (step S1). This request is not for power saving but for consumption (power storage). The HEMS controller 1 having received the request determines that it is possible to participate in the demand response (chargeable) on the basis of a monitoring result of the remaining power amount of the power storage device 3 (step S2), and sends, to the server 2, a response indicating participation (Opt In) (step S3). Meanwhile, when the power storage device 3 is fully charged, and further charging cannot be performed, a response indicating nonparticipation is sent. In this case, no subsequent steps are performed.

The HEMS controller 1 having sent the response indicating participation controls the power storage device 3 to be in a state of "charge", at the start of the demand response notified of from the server 2 (step S4). In addition, during the period of the demand response, the HEMS controller 1 monitors the operation state of the power storage device 3 (step S5), and the power storage device 3 replies that the power storage device 3 is charging.

Then, during the period of the demand response, when the remaining power amount of the power storage device 3 has reached an upper limit value set by the user, or when an abnormality has occurred, the power storage device 3 automatically stops charging (step S6). On the basis of the monitoring and a reply indicating the stop of the charging (step S7), the HEMS controller 1 recognizes that the charging has stopped, determines that the request for the demand response being requested is not achievable, and sends, to the server 2, a response indicating nonparticipation (Opt Out) (step S8).

According to the HEMS controller 1, or the energy management system 100 including the power storage device 3 and the HEMS controller 1, even in a case where a request for demand response has been received and a response indicating participation has been sent once, if, thereafter, the state has changed into a state in which the request for the demand response is not achievable due to a change in the power storage state, a response indicating nonparticipation can be sent to cancel the commitment to the demand response.

The server 2 having received the response indicating nonparticipation sends a request for demand response to an HEMS controller 1 of another customer, as in the case where power is to be suppressed. That is, if the server 2 having received a response indicating nonparticipation sends a request for demand response to an energy management device of another customer, the server 2 can determine a substitute for the customer receiving the request for demand response, and can realize demand response as a whole district.

Internal Configuration of HEMS Controller

Figure 8:
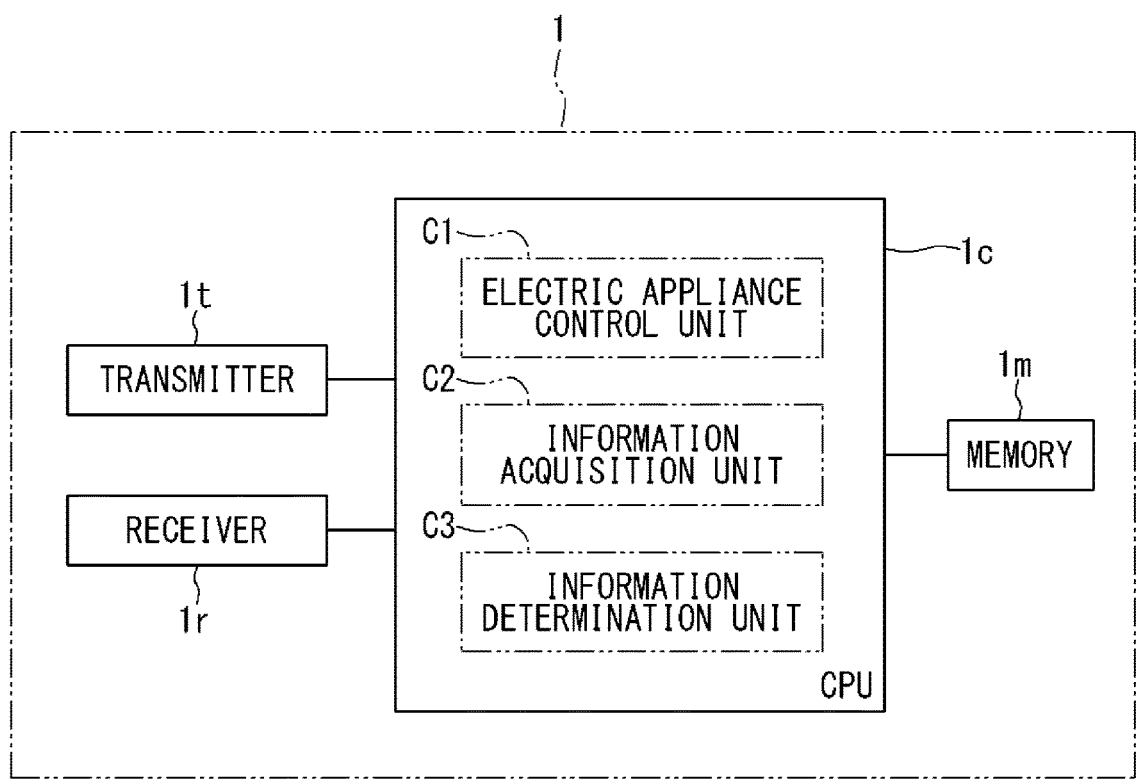
FIG. 8 is a schematic block diagram showing an internal configuration of the HEMS controller.

FIG. 8 is a schematic block diagram showing an internal configuration of the HEMS controller 1. For example, the HEMS controller 1 includes a CPU (Central Processing Unit) 1c, a transmitter 1t, a receiver 1r, and a memory (or storage) 1m. As function units realized by a computer program stored in the memory 1m, the CPU 1c includes an electric appliance control unit C1, an information acquisition unit C2, and an information determination unit C3, for example.

The electric appliance control unit C1 can transmit, from the transmitter 1t, a signal for controlling each electric appliance of the customer. The information acquisition unit C2 can acquire information of each electric appliance of the customer via the receiver 1r. With respect to demand response, the receiver 1r receives a request for demand response from the server 2. Regarding the request for the demand response, determination is made in the CPU 1c, and the transmitter 1t transmits a response indicating participation or nonparticipation. After the response indicating participation has been transmitted, if the HEMS controller 1 (in particular, the information acquisition unit C2 and the information determination unit C3) has determined that the request for the demand response is not achievable, the HEMS controller 1 can transmit a response indicating nonparticipation.

General Supplement Regarding System Configuration

Specifically, the server 2, the energy management device 1, and the information terminal 7 may be configured as a computer system that includes a CPU, a ROM (Read Only Memory), a RAM (Random Access Memory), an HDD (Hard Disk Drive), and the like. A computer program is stored in the RAM or the HDD. When the CPU operates according to the computer program, each device realizes a function thereof. The computer program is configured by combining a plurality of instruction codes indicating commands to the computer, in order to realize predetermined functions.

A part or the entirety of components forming each device described above may be implemented as a single system LSI. The system LSI is an ultra-multifunctional LSI manufactured by integrating a plurality of components on a single chip, and specifically, is a computer system configured to include a CPU, a ROM, a RAM, and the like. The RAM has a computer program stored therein. As a result of the CPU operating according to the computer program, the system LSI realizes the function thereof.

The present disclosure may be implemented as the methods described above. The present disclosure may be implemented as a computer program that causes a computer to realize these methods.

Further, the present disclosure may be implemented as a computer-readable non-transitory storage medium, such as an HDD, a CD-ROM, or a semiconductor memory, having stored therein the above computer program.

The present disclosure may be implemented as a configuration that transmits the above computer program via electric communication lines, wireless or wired communication lines, networks represented by the Internet, data broadcasting, and the like.

Each device described above may be realized by a plurality of computers.

A part or the entirety of the functions of each device described above may be provided through cloud computing. That is, a part or the entirety of the functions of each device may be realized by a cloud server.

Further, the above embodiment and the above modification may be combined.

Supplementary Notes

It should be noted that the embodiment disclosed herein is merely illustrative and not restrictive in all aspects. The scope of the present disclosure is defined by the scope of the claims, and is intended to include meaning equivalent to the scope of the claims and all modifications within the scope.

REFERENCE SIGNS LIST

1 HEMS controller (energy management device)
1c CPU
1m memory
1r receiver
1t transmitter
2 server
3 power storage device
4 television
5 air conditioner
6 lighting apparatus
7 information terminal
8 temperature-humidity sensor
10 customer
100 energy management system
C1 electric appliance control unit
C2 information acquisition unit
C3 information determination unit

The invention claimed is:

1. An energy management device provided for a customer and capable of controlling an electric appliance of the customer by communicating with a server, the server being configured to send a request for demand response, the energy management device comprising:
a receiver configured to receive the request for the demand response from the server;
a transmitter configured to transmit a response indicating participation or nonparticipation with respect to the request;
an electric appliance control unit configured to control the electric appliance; and
an information acquisition unit configured to acquire information of the electric appliance, wherein
the electric appliance includes a power storage device that is chargeable and dischargeable, the information of the electric appliance includes information indicating a power storage state of the power storage device, and
after the response indicating participation has been transmitted and a power adjustment has been started, the information indicating the power storage state of the power storage device is acquired a plurality of times after the power adjustment has been started, and at a time point at which determination that the power adjustment based on the request is not achievable by an end of a period of the demand response has been made on the basis of the acquired information acquired at one of the plurality of times, a response indicating nonparticipation is transmitted.

2. An energy management system comprising:
an energy management device provided for a customer and capable of controlling electric appliances of the customer by communicating with a server, the server being configured to send a request for demand response; and
a power storage device provided, for the customer, as one of the electric appliances, the power storage device is chargeable and dischargeable, the power storage device having a function of transmitting information indicating a power storage state of the power storage device to provide the information to the energy management device, wherein
the energy management device includes:
a receiver configured to receive the request for the demand response from the server,
a transmitter configured to transmit a response indicating participation or nonparticipation with respect to the request,
an electric appliance control unit configured to control each electric appliance, and
an information acquisition unit configured to acquire the information of the electric appliance, and
after the response indicating participation has been transmitted and a power adjustment has been started, the information indicating the power storage state of the power storage device is acquired a plurality of times after the power adjustment has been started, and at a time point at which determination that the power adjustment based on the request is not achievable by an end of a period of the demand response has been made on the basis of the acquired information acquired at one of the plurality of times, a response indicating nonparticipation is transmitted.

3. An energy management system comprising:
a server configured to send a request for demand response; and
an energy management device provided for a customer and capable of controlling an electric appliance of the customer by communicating with the server, wherein
the energy management device includes:
a receiver configured to receive the request for the demand response from the server,
a transmitter configured to transmit a response indicating participation or nonparticipation with respect to the request,
an electric appliance control unit configured to control the electric appliance, and
an information acquisition unit configured to acquire information of the electric appliance,
the electric appliance includes a power storage device that is chargeable and dischargeable, the information of the electric appliance includes information indicating a power storage state of the power storage device, and
after the response indicating participation has been transmitted and a power adjustment has been started, the information indicating the power storage state of the power storage device is acquired a plurality of times after the power adjustment has been started, and at a time point at which determination that the power adjustment based on the request is not achievable by an end of a period of the demand response has been made on the basis of the acquired information acquired at one of the plurality of times, a response indicating nonparticipation is transmitted.

4. The energy management system according to claim 3, comprising an information terminal communicable with the energy management device, wherein the energy management device has a function of receiving a setting for the electric appliance from the information terminal.

5. The energy management system according to claim 4, wherein the energy management device notifies the information terminal that the energy management device has received the request, and the energy management device receives an instruction as to participation or nonparticipation from the information terminal, and transmits a response to the server.

6. An energy management method to be performed between a server configured to send a request for demand response, and an energy management device provided for a customer and capable of controlling an electric appliance of the customer by communicating with the server, the electric appliance including a power storage device that is chargeable and dischargeable, the energy management method comprising:

transmitting, by the server, the request for the demand response to the energy management device;

transmitting, by the energy management device, a response indicating participation, when demand response is possible at a time point of reception of the request;

acquiring, by the energy management device, information indicating a power storage state of the power storage device a plurality of times after the response indicating participation has been transmitted and a power adjustment has been started, and transmitting, by the energy management device, a response indicating nonparticipation at a time point at which, on the basis of the acquired information acquired at one of the plurality of times, the energy management device has determined that the power adjustment based on the request is not achievable by an end of a period of the demand response; and transmitting, by the server, a request for demand response to an energy management device of another customer when the server has received the response indicating nonparticipation.

7. The energy management device according to claim 1, wherein the information indicating the power storage state of the power storage device includes information indicating a remaining power amount of the power storage device, and after the response indicating participation has been transmitted and the power adjustment has been started, the information indicating the remaining power amount of the power storage device is acquired the plurality of times after the power adjustment has been started, and when the determination that the power adjustment based on the request is not achievable by the end of the period of the demand response has been made on the basis of the acquired information acquired at the one of the plurality of times, the response indicating nonparticipation is transmitted.

\* \* \* \* \*